July 24, 1923.

C. H. GILL 1,462,807

SPEED CONTROLLING MECHANISM

Original Filed March 28, 1921  5 Sheets-Sheet 1

Fig. 1.

Witness:

Inventor

Charles H Gill

Patented July 24, 1923.

1,462,807

UNITED STATES PATENT OFFICE.

CHARLES H. GILL, OF CHICAGO, ILLINOIS.

SPEED-CONTROLLING MECHANISM.

Application filed March 28, 1921, Serial No. 456,195. Renewed June 8, 1923. Serial No. 585,073.

*To all whom it may concern:*

Be it known that I, CHARLES H. GILL, a citizen of the United States, residing at Chicago, in the county of Cook and State of Illinois, have invented a new and useful Speed-Controlling Mechanism, of which the following is a specification.

My invention relates to means for maintaining the operative speed of a motor driven machine at whatever constant rate the same may be set for at the will of the operator, the said means operating automatically to increase or decrease the speed of the motor to offset automatic or manually brought about changes in the ratio of the speed of the machine to the speed of the motor. This invention is an improvement, or further development, of my machine control mechanism, forming the subject of my application for Letters Patent, Serial No. 454,200, filed March 21st, 1921, and, as in the case of the just mentioned invention, is particularly adapted to be used in conjunction with automatic speed changing mechanism, such as disclosed by me in my patent for friction transmission mechanism, No. 1,410,747, granted March 28th, 1922, and in my applications for Letters Patent for transmission mechanism, Serial No. 433,930, filed December 29th, 1920; and for crank transmission mechanism, Serial No. 437,801, filed January 17th, 1921.

My present application is specifically for the purpose of disclosing and claiming certain improvements in the means for automatically changing the speed of the motor as required to maintain the speed of the vehicle or other machine at a determined rate, such rate being controlled by the operator at will. In the application of this invention to the control of automobiles, for which it is particularly suited, the driver is enabled to set an indicating pointer to indicate the desired mileage per hour that he wishes the automobile to travel, and my speed controlling mechanism will automatically maintain the vehicle at that exact speed, regardless of changing road or load conditions, so long as the speed indicated is not in excess of the ability of the motor to deliver under the conditions. In such case, where power in excess of the maximum of the motor is called for to maintain the speed desired, such speed cannot be obtained but, in that case, the vehicle will be operated at highest travel speed the power of its motor is capable of driving it at under the then existing conditions of road and load. The use of my invention on automobiles will permit of dispensing with both speedometers and odometers geared to the vehicle wheels, since the machine will always travel at the speed set for, within the limits of the motor's capacity, and the indication of the control lever will always show the travel speed in miles or other units per hour or other period. A simple set of counting gears driven in proportionate unison with the driven shaft of the vehicle serves to record the mileage travelled.

Not only will the employment of my speed controlling mechanism, in conjunction with one of my forms of automatic speed ratio regulating transmission mechanism, greatly simplify the driving of motor vehicles, but it will be productive of the utmost fuel or power economy. The motor will always be operated at the lowest speed which will drive the vehicle at the desired travel speed under the road and load conditions and will automatically be regulated as these conditions change in a manner that would be impossible for even the most careful driver to do manually or by the exercise of his discretion. It will be obvious that the features of brake control and reverse mechanism control operated by the single control lever in the construction disclosed in my application for Letters Patent for machine control mechanism, above referred to, may equally well be operated by the control lever in my presently disclosed construction.

In the previous construction, just referred to, the same objects attained by the presently disclosed construction were attained, within certain limits, by differing means. However, certain conditions, such as differences in the quality of the fuel used, might tend to cause the vehicle controlled in that way to vary somewhat from the travel speed it was set to maintain, while my presently disclosed construction insures strict maintenance of the speed set for under all conditions of fuel, temperature, grade, road condition and load carried, within the power limitations of the motor with the fuel used.

The objects of my invention are, first, to provide a rotatable member adapted to be driven at a constant speed; second, to provide means for driving the said rotatable member; third, to provide means for maintaining the rotary speed of the said rotatable member constant under varying conditions; fourth, to provide means for adjusting the constant speed of the said rotatable member so that the same may be caused to have a constant rotation speed bearing a fixed ratio to other elements of the mechanism when said elements are in given positions and when the motor is operating at a given speed; fifth, to provide means for automatically winding the spring motor when such class of motor is employed as the means for driving the said rotatable member; sixth, to provide a second rotatable member movable in relation to the first named rotatable member and adapted to be rotated by the said first named rotatable member at speeds varying with the relative positions of the said rotatable members; seventh, to provide means for moving the said second rotatable member relative to the said first named rotatable member at the will of and to the extent desired by the operator; eighth, to provide a shaft driven at a speed bearing a fixed ratio to the speed of the shaft transmitting rotation to the wheels of the vehicle or to the machine being operated; ninth, to provide means whereby the said second rotatable member is adapted to increase or decrease the motive power supplied to the motor until the speed of the said second rotatable member, in its then position relative to the said first named rotatable member, is equal to the speed of the said shaft driven at a speed bearing a fixed ratio to the speed of the shaft transmitting rotation to the wheels of the vehicle or to the machine being operated; and, tenth, to provide a shaft driven at speed bearing a fixed ratio to the speed of the shaft transmitting rotation to the wheels of the vehicle and adapted to drive a set of counting wheels for recording the distance travelled by the vehicle.

I attain these objects, and others as may hereinafter appear, by means of the mechanism illustrated in the accompanying drawings, in which—

Figure 2 is an enlarged plan detail of the control lever and scale plate and steering wheel.

Similar numerals refer to similar parts throughout the several views.

Figure 1:
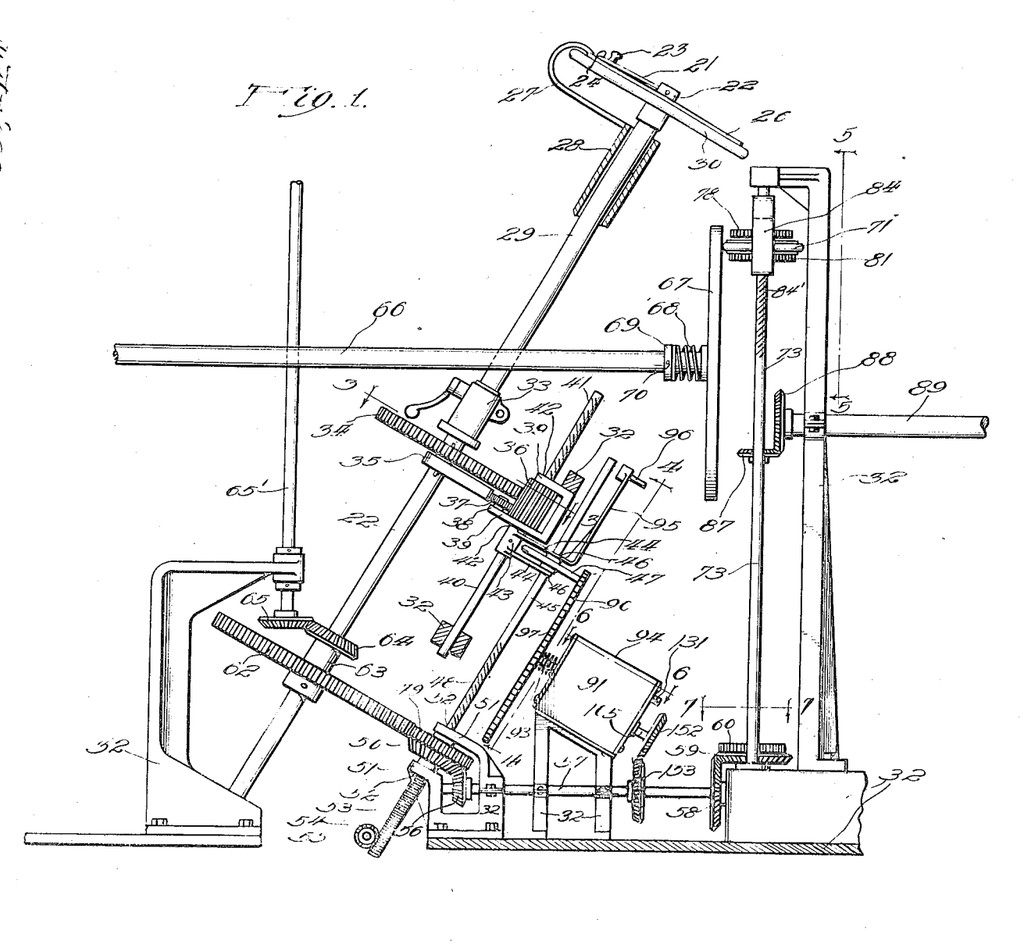
Figure 1 is a side elevation and partly sectional view of the entire mechanism.
Figure 3:
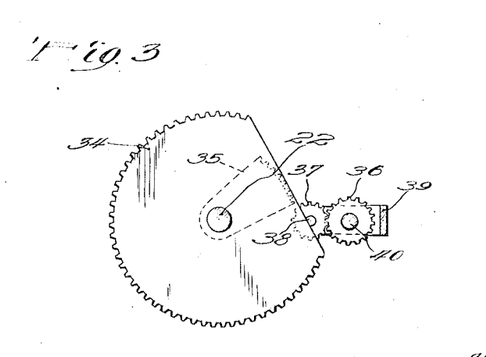
Figure 3 is an enlarged detail section taken on the line 3—3 of Figure 1.
Figure 4:
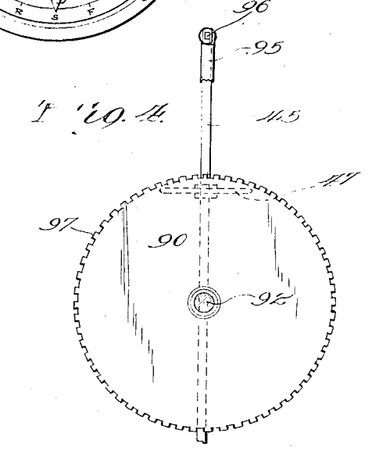
Figure 4 is an enlarged detail section taken on the line 4—4 of Figure 1.
Figure 5:
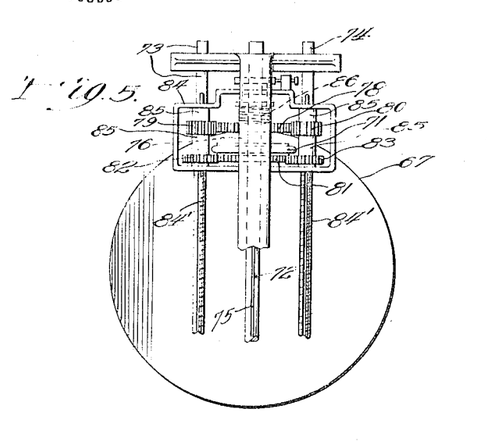
Figure 5 is a section taken on the line 5—5 of Figure 1.
Figure 6:
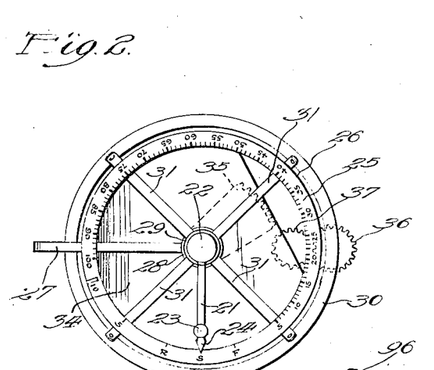
Figure 6 is an enlarged plan detail taken on the line 6—6 of Figure 1.
Figure 7:
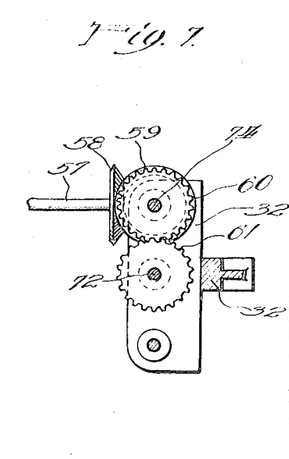
Figure 7 is a section taken on the line 7—7 of Figure 1.

In this disclosure of construction, I employ the same mechanism as in the construction forming the subject of my application for Letters Patent for machine control mechanism, as above referred to, with only such modifications as are required to adapt my speed controlling mechanism to operate in conjunction therewith. Therefore, as in the application referred to, 21 designates a control lever secured to one end of a shaft 22 and adapted to partially rotate that shaft whenever the lever 21 is moved with that shaft 22 as an axis. The lever 21 is supplied with a handle 23 for convenience and with a pointer portion 24 adapted to indicate graduations 25 upon a scale plate 26 which is secured by means of a bracket 27 to the steering post 28. The steering post 28 is a stationary sleeve secured to the floor or frame of the vehicle and a steering sleeve 29 passes through and is journaled in the steering post 28. A steering wheel 30 is secured to the upper end of the steering sleeve 29 where that sleeve projects above the top of the steering post 28 and the bracket 27 is fixed to the steering post 28 and is curved around the periphery of the steering wheel 30 in such manner as to support the scale plate 26 within the rim of the steering wheel 30 and above the spider arms 31 which connect the rim of the steering wheel 30 to the steering sleeve 29. The shaft 22 passes through the steering sleeve 29 and projects slightly above the top of that sleeve, the control lever 21 being fixed to the shaft 22 upon this projecting portion. Thus, the lever 21 is above the scale plate 26 and its pointer portion 24 is adapted to indicate graduations upon that scale plate.

The steering sleeve 29 is provided with the usual connections 33 for operating the steering gear, which is not illustrated as it forms no part of my invention and is not necessary for clearness.

The mechanism employed in this construction for transmitting rotary motion from the motor to the vehicle wheels is the same as that illustrated and described in connection with my application for Letters Patent on machine control mechanism, above referred to, and similar numerals to those used to designate parts therein will be employed to designate the same parts in this application.

A shaft 66 is driven by the motor and carries a friction disk 67 which is feathered upon the shaft 66 in such manner as to be slidable longitudinally of and upon that shaft but secured for rotation therewith. A spiral spring 68 surrounds the shaft 66 and presses one of its ends against a collar 69 which is adjustably secured to the shaft 66 by means of a set screw 70 and the other end of the spring 68 presses against the friction disk 67 and urges it away from the collar 69. The tension of the spring 68 can be adjusted by manual movement of the collar 69 and the securing of that collar by means of the set screw 70.

A friction wheel 71 is rotatably mounted upon a shaft 72 and is freely slidable longitudinally of and upon that shaft which is journaled for rotation in the frame 32. Shafts 73 and 74 are also journaled in the frame 32 and are parallel with and one upon each side of the shaft 72. The shaft 72 is provided with a keyway 75 therein and running longitudinally thereof and a collar 76, which loosely surrounds the shaft 72, is provided with an internally projecting feather 77 which engages with the keyway 75 and is thus locked to the shaft 72 for rotation therewith while being freely slidable longitudinally thereof and thereon. A gear wheel 78 is secured to the collar 76 for rotation and longitudinal movement therewith and the gear wheel 78 engages with and is adapted to rotate the pinions 79 and 80, which are respectively feathered upon the shafts 73 and 74, thus rotating these shafts. A gear wheel 81 is secured to the friction wheel 71 for rotation and longitudinal movement therewith and this gear wheel 81 engages with and is adapted to rotate pinions 82 and 83, which are internally threaded and which respectively engage with the threads 84' upon the shafts 73 and 74, upon each of which one of the said pinions is mounted. The threads 84' upon the shafts 73 and 74 are similarly inclined so that the internally threaded pinions 82 and 83 will travel upwardly or downwardly upon their respective shafts in unison with each other whenever they are rotated at a speed differing from the rotary speed of their respective shafts. When rotated at like speeds, and in like directions, to their respective shafts, the pinions 82 and 83 will remain stationary in respect to their shafts.

The gear wheel 78 is somewhat greater in diameter than the gear wheel 81 and the pinions 79 and 80 are correspondingly smaller in diameter than the pinions 82 and 83, so that when the gear wheels 78 and 81 are rotating in the same direction (which they always do) and at the same rate of rotation the shafts 73 and 74 will be rotated at somewhat greater speed than the internally threaded pinions 82 and 83 thereon and those pinions will, consequently, move upwardly upon their respective shafts through their screw engagement therewith.

A frame 84 embraces the friction wheel 71, the collar 76, the gear wheels 78 and 81 and the pinions 79, 80, 82 and 83, being provided with openings therein for the passage therethrough of the shafts 72, 73 and 74, and being adapted to slide upwardly or downwardly upon the said shafts. Washers 85 surround the various shafts within the frame 84 and maintain the elements therein in spaced positions relative to each other, so that when the pinions 82 and 83 move upwardly or downwardly the frame 84 and all the elements embraced thereby will move therewith while retaining their respective positions relative to each other.

A spiral spring 86 surrounds the shaft 72 and abuts at its lower end against the gear wheel 78, pressing the collar 76 into frictional contact with the flat surface of the friction wheel 71 and tending to bind the collar 76 against the friction wheel 71 in such manner as to cause the collar 76 to be rotated with the friction wheel 71 whenever the resistance offered to the rotation of the collar 76 is not greater than the frictional resistance to its slippage against the friction wheel 71.

A bevel gear wheel 87 is fixed upon the shaft 72 and engages with a bevel gear wheel 88 fixed upon a shaft 89 which is journaled in the frame 32 and which is adapted to transmit rotation to the wheels of the vehicle.

The effect of the transmission mechanism just described is to automatically change the ratio of the speed of the shaft 89 to the speed of the shaft 66 in proportion to changes in the resistance offered to the rotation of the shaft 89. When a hill is encountered, or other resistance added to the rotation of the shaft 89, the collar 76, which is feathered upon the shaft 72, will tend to slip in its frictional engagement with the face of the friction wheel 71 in proportion to such increase of resistance and this will cause the shafts 73 and 74 to be rotated less rapidly than the internally threaded pinions 82 and 83, which are driven by the friction wheel 71 through the gear wheel 81. Thus, the pinions 82 and 83 will spiral downwardly upon their respective threaded shafts, taking the frame 84 and its contents therewith, and causing the friction wheel 71 to frictionally engage the friction disk 67 nearer the axis of the friction disk 67, thus reducing the ratio of the speed of the shaft 89 to the speed of the shaft 66 to whatever degree may be necessary to prevent the collar 76 from slipping against the friction wheel 71 in excess of the amount of slippage which serves to equalize the rotary speeds of the shafts 73 and 74 and the pinions 82 and 83. When such equalization of rotary speeds is attained the friction wheel 71 will maintain its position with respect to the friction disk 67 until some other change in the degree of resistance offered to the rotation of the shaft 89 occurs. Should that change be in the direction of further resistance, the friction wheel 71 will be moved still nearer to the axis of the friction disk 67. Should the change be in the direction of lessened resistance, the small degree of slippage of the collar 76 which is necessary for the maintenance of equality in speeds of rotation of the shafts 73 and 74 and the pinions 82 and 83 will be lessened and will cause the shafts 73 and 74 to rotate faster than the pinions 82 and 83, causing those pinions to spiral upwardly upon those shafts and to thus move the friction wheel 71 to a position so that it engages the friction disk 67 at a greater distance from the axis of that disk, consequently increasing the ratio of the speed of the shaft 89 to the speed of the shaft 66.

The shaft 22 has fixed to it, at a point below the termination of the steering sleeve 29, two segmental gear wheels 34 and 35. The segmental gear wheel 34 is of large diameter and is adapted to engage directly with a wide pinion 36, which is internally threaded. The segmental gear wheel 35 is of smaller diameter than the other and is adapted to engage with an idler pinion 37 which also engages with the wide pinion 36. The pinion 37 is rotatably mounted upon a fixed stub shaft 38 projecting from a bracket 39 secured to the frame 32. The bracket 39 embraces the wide pinion 36 in such manner as to prevent the pinion 36 from having longitudinal movement. A shaft 40, having a threaded portion 41, passes through circular openings 42 in the bracket 39 and through the internally threaded wide pinion 36, having screw engagement with the pinion 36 so that rotation of the pinion 36 in either direction will cause the shaft 40 to move upwardly or downwardly, depending upon the direction of rotation of the pinion 36.

The lower and unthreaded portion of the shaft 40 is slidably journaled in the frame 32 and a collar 43, having extending arms 44, is secured rigidly to the shaft 40. A shaft 45 is slidably journaled in the frame 32 and passes through circular openings 46 in the extending arms 44 of the collar 43. The said extending arms 44 embrace a frictional driven wheel 47 which is slidably mounted upon the shaft 45 in such manner that the frictional driven wheel 47 will be carried upwardly or downwardly upon the shaft 45 in unison with the longitudinal movements of the shaft 40. The frictional driven wheel 47 is splined upon the shaft 45 so that the shaft 45 is freely slidable longitudinally through the said frictional driven wheel but is compelled to rotate with that wheel 47. A portion 48 of the shaft 45 is threaded and engages with internal threads of a gear wheel 49 which is mounted upon the shaft 45. A bevel gear wheel 50 is fixed to the gear wheel 49 and mounted with it upon the shaft 45. Arms 51 extend from the frame 32 and embrace the combined gear wheel 49 and bevel gear wheel 50 to prevent movement of those gear wheels longitudinally upon the shaft 45, that shaft passing through circular openings 52 in the arms 51. The lower portion of the shaft 45 is provided with circumferential rack teeth 53 which engage with a pinion 54 fixed upon the stem 55 of a throttle valve (not shown) which controls the volume of fuel or steam fed to the motor. In the position shown in the drawing (Fig. 1) the throttle valve is fully opened.

A bevel gear wheel 56 is fixedly mounted upon a shaft 57 and engages the bevel gear wheel 50. The shaft 57 is journaled in the frame 32 and is provided with a bevel gear wheel 58 fixedly mounted thereon and engaging with a bevel gear wheel 59 which is mounted for free rotation upon the shaft 73 and which has fixed to it a gear wheel 60, also loosely mounted upon the shaft 74, so that the bevel gear wheel 59 and gear wheel 60 must rotate together. The gear wheel 60 is engaged by a gear wheel 61 which is fixedly mounted upon the shaft 72 for rotation therewith.

A gear wheel 62 is fixed upon a sleeve 63 which is loosely mounted for rotation as an idler upon the shaft 22. A bevel gear wheel 64 is also fixedly mounted upon the sleeve 63 and engages a bevel gear wheel 65 fixedly mounted upon a shaft 65' which is journaled in the frame 32 and which may lead to a train of computing gears (not shown) for recording the distance travelled by the vehicle.

A friction driving disk 90 is driven by a spring motor 91 at a constant rotary speed and frictionally engages and rotates the friction driven wheel 47 at proportionate speeds varying with the distance from the axis of the friction disk 90 of the engaging periphery of the friction driven wheel 47. The friction driving disk 90 is splined upon a shaft 92 of the spring motor 91 and is pressed into engagement with the friction driven wheel 47 by a spiral spring 93, one end of which presses against the friction driving disk 90 and the other end against the casing 94 of the spring motor 91.

An extension 95 of one of the arms 44 has a portion 96 bent at right angles and adapted to engage with teeth 97 upon the periphery of the friction driving disk 90 whenever the shaft 40 is moved downwardly enough to bring the periphery of the friction driven wheel 47 to engagement with the friction driving disk 90 at its axis of rotation. Thus, the friction driving disk 90 is stopped from rotating, and the spring power conserved, when there is no purpose in such rotation.

Figure 8:
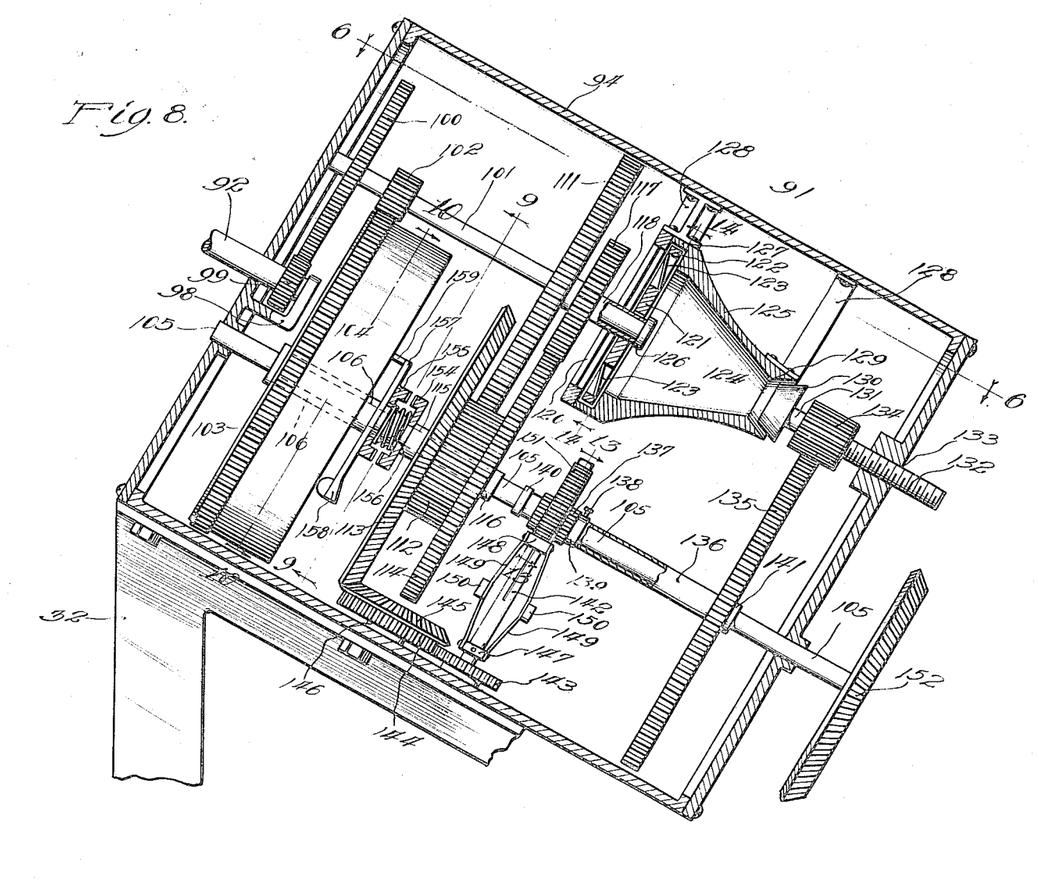
Figure 8 is a section taken on the line 8—8 of Figure 6.

Within the casing 94 of the spring motor 91, the shaft 92 is journaled in a bracket 98 secured to the casing 94 and in the casing 94 and is provided with a pinion 99 fixed thereon which meshes with a gear wheel 100 fixedly mounted upon a shaft 101. The shaft 101 is journaled in the casing 94 at one end and in the governor casing, to be later described, at the other end. A pinion 102 is fixedly mounted upon the shaft 101 and engages with gear teeth 103 upon the periphery of the spring-barrel 104. A shaft 105 is journaled in the casing 94 and is provided with a loosely fitting sleeve 106 upon which the spring-barrel 104 is mounted to rotate independently thereof. A coil spring 107 has its inner end secured to the sleeve 106 and its outer end secured to the spring-barrel 104. The sleeve 106 has fixedly mounted thereon a ratchet wheel 108 adapted to be engaged by a pawl 109 pivoted upon the spring-barrel 104 by means of a pin 110 to prevent the sleeve 106 from being rotated by the spring 107 but permitting rotation of the sleeve in the direction for winding the spring 107.

The shaft 101 has a large gear wheel 111 fixedly mounted thereon and this engages a wide gear wheel 112 which is loosely mounted for free rotation upon the shaft 105 and which carries with it in rotation a bevel gear wheel 113 and a gear wheel 114, which are fixed to the gear wheel 112 and loosely mounted upon the shaft 105. Collars 115 and 116 fixed upon the shaft 105 retain the three combined gear wheels in position longitudinally of that shaft. The gear wheel 114 engages with a small gear wheel 117 which is fixedly mounted upon a sleeve 118 which is loosely mounted upon the shaft 101 for free rotation thereon.

The sleeve 118 passes through a journal which is supported in position by spider arms 120 projecting from the governor casing 125 across the circular end comprising the air entrance of the governor. One end of the shaft 101 thus journals within the sleeve 118. Fixedly secured upon the sleeve 118 is a fan rotor comprising a central disk 121, a solid peripheral portion 122 and fan blades 123 set at an angle to the central disk 121 and the peripheral portion 122 and adapted to force air into the chamber 124 formed by the conical walls of the governor casing 125 when the fan blades are rotated in the proper direction therefor. A collar 126 is fixed upon the end of the shaft 101 beyond the sleeve 118 to prevent longitudinal movement of that sleeve in one direction and the gear wheel 111 prevents its movement in the other direction. The peripheral portion 122 of the rotor is adapted to rotate within a circumferential groove 127 formed in the governor casing 125. The governor casing 125 is supported in position by arms 128 secured to it and to the spring motor casing 94. The air outlet end of the governor casing 125 consists of a bevel opening 129 which is adapted to be wholly or partially closed by a conical stopper 130 fixedly mounted at the end of a shaft 131 which is provided with screw threads 132 which engage with internal threads in an opening 133 through the casing 94. The size of the air outlet may be adjusted by screwing the shaft 131 inwardly or outwardly.

The governor just described and employed in this construction of my invention is essentially the same as that disclosed and claimed in my Patent, No. 1,350,018, patented August 17th, 1920, and reference may be had to that patent in connection herewith. The following is not, however, disclosed in that patent but is an additional governing means to insure more perfect stability of rotation of the friction driving disk 90.

A wide pinion 134 is fixedly mounted upon the shaft 131 and is engaged by a large gear wheel 135 which is fixedly mounted upon a sleeve 136 which is freely rotatable upon the shaft 105. A pinion 137 is loosely mounted upon the sleeve 136 but is adapted to be secured to that sleeve by means of a set screw 138 working through a projecting hub 139 of the pinion 137. The sleeve 136 is retained in position longitudinally of the shaft 105 by means of collars 140 and 141 secured upon that shaft.

A shaft 142 is journaled in the casing 94 and has fixedly mounted thereon a gear wheel 143 which meshes with an idler gear wheel 144 having secured thereto a bevel gear wheel 145, both of the gear wheels 144 and 145 rotating together upon a stub shaft 146 secured in and projecting from the casing 94. The bevel gear wheel 145 is engaged by the bevel gear wheel 113.

A collar 147 is secured upon the shaft 142 and a sleeve 148 is slidably mounted and splined thereon. Flat springs 149 have one end secured to the collar 147 and their other ends secured to the sleeve 148. Weights 150 are secured to the springs 149 at their centers. The sleeve 148 is provided with circumferential rack teeth 151 which engage with the pinion 137.

The means for maintaining the spring 107 in wound condition and for preventing overwinding of the same, which is now to be described, is a modification of the means disclosed and claimed in my Patent No. 1,332,870, granted March 2nd, 1920, and in my application for Letters Patent, Serial No. 456,194, filed March 28th, 1921, for spring winding mechanism.

A bevel gear wheel 152 is fixedly mounted upon the shaft 105 outside of the casing 94 of the spring motor 91 and engages with a bevel gear wheel 153 which is fixedly mounted upon the shaft 57 so that the shaft 105 is always rotating in the direction of winding of the spring 107 when the shaft 57 is rotating.

Figures 9, 10, 11, 12, 13, 14:
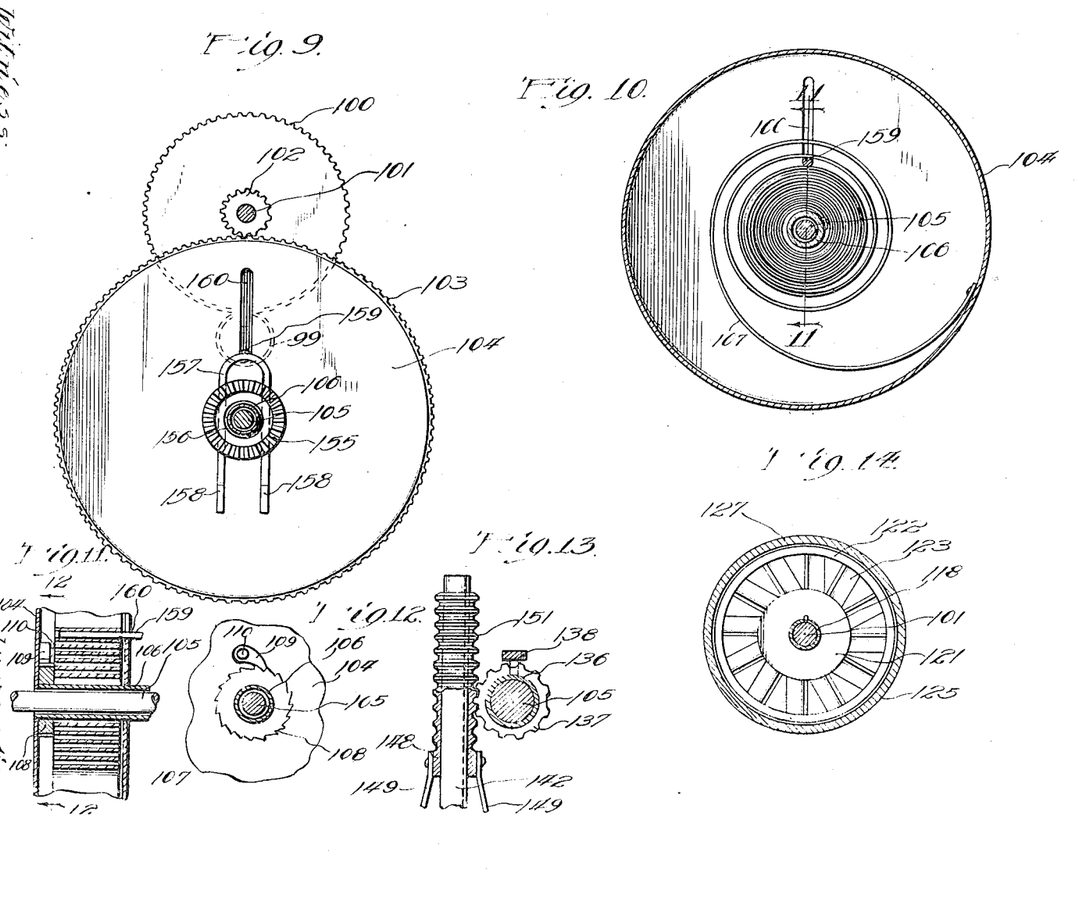
Figure 9 is a section taken on the line 9—9 of Figure 8.
Figure 10 is a detail section taken on the line 10—10 of Figure 8.
Figure 11 is a detail section taken on the line 11—11 of Figure 10.
Figure 12 is a detail section taken on the line 12—12 of Figure 11.
Figure 13 is an enlarged detail section taken on the line 13—13 of Figure 8.
Figure 14 is a section taken on the line 14—14 of Figure 8.

A clutch member 154 is fixedly mounted upon the shaft 105 and is adapted to be engaged by another clutch member 155 which is splined upon the sleeve 106 to have longitudinal movement upon that sleeve but to rotate that sleeve with it. A spiral spring 156 surrounds the shaft 105 and sleeve 106 and normally urges the clutch member 155 out of engagement with the clutch member 154. A bifurcated arm 157 straddles the sleeve 106, as best shown in Figure 9, and the ends of this bifurcated arm 157 are provided with cam surfaces 158 which are adapted to cam the clutch member 155 into engagement with the clutch member 154 whenever the cam surfaces 158 are moved to position between the clutch member 155 and the spring-barrel 104, thus causing the shaft 105 and the sleeve 106 to become locked together for rotation and to thus wind the spring 107. When the cam surfaces 158 are moved out of position between the clutch member 155 and the spring-barrel 104 the spiral spring 156 will force the clutch member 155 out of engagement with the clutch member 154 and the spring 107 will then be wound no further.

A pin 159 projects from the bifurcated arm 157 at right angles thereto and passes through a slot 160 in the spring-barrel 104, extending within the spring-barrel 104 and passing between convolutions of the spring 107, preferably between the second and third convolutions from the outside. Thus, as the spring 107 unwinds, the expanding third convolution will push the pin 159 along the slot 160 toward the periphery of the spring-barrel 104 and this will draw the bifurcated arm 157 to position to cam the clutch member 155 into engagement with the clutch member 154 to rewind the spring 107. As the second outer convolution is drawn in toward the sleeve 106 by the winding process it will draw the pin 159 toward the center of the spring-barrel 104 and will allow the clutch members 154 and 155 to disengage under the urge of the spiral spring 156. It should be noted in this connection that the action of a coil spring in winding from a central shaft or sleeve is to bring each convolution substantially tight before the next convolution is materially drawn toward the winding center, and its unwinding action is the same in reverse order. Hence, the spring 107 will be practically fully wound when the pin 159 is brought toward the center of the spring-barrel 104 enough to disengage the clutch members 154 and 155. In the same way, the spring 107 will be considerably unwound before the travel of the pin 159 toward the periphery of the spring-barrel 104 progresses enough to effect engagement of the clutch members 154 and 155. Hence, the spring 107 will always be wound to a degree, because it will be kept wound so long as the vehicle is travelling and will be stopped from unwinding when the vehicle is at rest by the locking of the friction driving disk 90 by the engagement of the part 96 with the teeth 97 on the periphery of that friction driving disk.

The friction driving disk 90 is rotated at absolutely constant speed by the spring 107 which, being fast at its outer end to the inside of the spring-barrel 104, causes that barrel to rotate under the uncoiling urge of the said spring. Through the gear teeth 103 upon the spring-barrel 104, multiplied rotary motion is transmitted to the pinion 102 and the shaft 101 and gear wheel 100. The gear wheel 100 further multiplies the number of rotations in its engagement with the much smaller pinion 99 which rotates the shaft 92 and the friction driving disk 90 splined thereon.

Constancy of rotational rate for the friction driving disk 90 is obtained first by means of a pneumatic governor and next by a very sensitive centrifugal governor which regulates the first governor. When making the initial adjustments to obtain the correct speed rate for the friction driving disk 90, the set screw 138 in the hub 139 of the pinion 137 is loosened so that the pinion is loose on the sleeve 136. The mechanism is then allowed to run, the large gear wheel 111 transmitting multiplied rotary motion to the idle gear wheel 112 and its attached bevel gear wheel 113 and attached gear wheel 114. The gear wheel 114 transmits further multiplied rotary speed to the smaller gear wheel 117 and to the sleeve 118 upon the shaft 101. The rotor comprising the solid central portion 121, fan blades 123 and solid peripheral portion 122 is fixed upon the sleeve 118 to rotate therewith and this tends to force air into the air chamber 124 formed by the governor casing 125. The degree of compression of the air in the space 124 will depend upon the speed of rotation of the fan blades 123 and the position of the conical stopper 130 in the bevelled opening 129. If the air is forced within the space 124 faster than it can escape around the periphery of the rotor, through the groove 127, and through the outlet space allowed by the position of the stopper 130 this compressed air will exert a braking effect upon the fan blades 123 proportional to the degree of compression existing. By screwing the shaft 131 back and forth, a point will be reached where the speed of the friction driving disk 90 will be maintained substantially constant at the desired speed by this governing means. The stopper is then left in the adjusted position. While the device is operating at exactly the desired speed, the set screw 138 in the hub 139 of the pinion 137 is tightened against the sleeve 136, locking that pinion thereto. Since the weights 150 are, at that speed, at a given distance from their axis of rotation, it will be evident that any slight change in speed will cause their inward or outward movement and will cause the sleeve 148 to move longitudinally of and upon the shaft 142. Any movement of this nature will rotate the pinion 137 and sleeve 136 through the engagement with that pinion of the circumferential rack teeth 151 upon the sleeve 148. A very slight rotational move of the sleeve 136 will be transmitted to the shaft 131 greatly multiplied through the gear wheel 135 engaging with the pinion 134 and will change the size of the outlet by changing the position of the stopper 130. Rotary motion is given to the shaft 142 through the engagement of the gear wheel 143, which is fast thereon, with the gear wheel 144 which rotates with the bevel gear wheel 145, engaged by the large bevel gear wheel 113.

The bevel gear wheel 152 upon the shaft 105 is driven by the bevel gear wheel 153 upon the shaft 57 and supplies power for winding the motive spring 107, as before described.

The driving power of the motor is transmitted to the running gear of the vehicle by means of a driving shaft 66 which rotates the spring pressed friction disk 67 with it. This disk frictionally drives the friction wheel 71 and the collar 76 splined upon the shaft 72 at speeds varying in ratio to the speed of the shaft 66 according to the point of engagement of the friction disk 67 and the friction wheel 71. It is thought to be unnecessary to describe the method by which this point of engagement is automatically varied according to the resistance offered to the rotation of the shaft 89 in this specification as the same forms no part of my present invention and is fully described in the specification accompanying my application for Letters Patent for machine control mechanism, Serial No. 454,200, filed March 21st, 1921, heretofore referred to.

The rotary motion transmitted to the shaft 72 is further transmitted by it to the shaft 89, leading to the running gear of the vehicle, through the engagement of the bevel gear wheel 87 on the shaft 72 with the bevel gear wheel 88 on the shaft 89.

The shaft 72 also drives the shaft 57 through the engagement of the gear wheel 61 on the shaft 72 with the gear wheel 60, rotatably mounted on the shaft 74; and the engagement of the bevel gear wheel 59, secured for rotation with the gear wheel 60, with the bevel gear wheel 58 upon the shaft 57. The rotary motion of the shaft 57 is communicated at a reduced rate to the internally threaded bevel gear wheel 50 and at a further reduced rate to the shaft 65' through engagement of the gear wheel 49, secured for rotation with the bevel gear wheel 50, with the gear wheel 62 on the sleeve 63 and engagement of the bevel gear wheel 64 on said sleeve with the bevel gear wheel 65 on the shaft 65'. The shaft 65' may lead to a set of counting gears and thus count the miles or other units of distance travelled by the vehicle, since the number of rotations of the shaft 65' is proportional to the number of rotations made by the drive wheels of the vehicle.

As the internally threaded bevel gear wheel 50 is rotated at a speed bearing a fixed ratio to the speed of the shaft 89, and in screw engagement with the shaft 45, it will be evident that when the speed of the bevel gear wheel 50 is in excess of the speed of the shaft 45, and being always in the same direction of rotation, the result will be that the shaft 45 will be caused to travel through the bevel gear wheel 50 in a downward direction. Through the engagement of the circumferential rack teeth 53 on one part of the shaft 45 with the pinion 54 on the throttle valve stem 55, this downward movement of the shaft 45 will tend to close the throttle valve in proportion to the extent of such downward movement until a point is reached where the speed of the motor is sufficiently checked to cause the bevel gear wheel 50 to be rotated at a speed not exceeding the rotary speed of the shaft 45. Should the motor be checked more than enough to reduce the speed of the shaft 89 to the fixed ratio that will give the bevel gear wheel 50 the same speed as the shaft 45, then the shaft 45 will tend to travel upward through the bevel gear wheel 50 and to increase the speed of the motor until equality of speed between the shaft 45 and the bevel gear wheel 50 is attained.

Since the friction driving disk 90 is rotated at a constant speed through the mechanism of the spring motor 91, the operation of which has already been described, the exact speed at which the shaft 45 is driven will depend upon the position upon that shaft of the frictional driven wheel 47, which is splined upon the shaft 45. Through the embracing arms 44 projecting from the collar 43 which is secured to the shaft 40, upward or downward movements of the shaft 40 are communicated to the frictional driven wheel 47 and the position of the frictional driven wheel 47 with respect to the axis of the friction driving disk 90 is governed by the position of the shaft 40. When the shaft 40 is moved downwardly enough to bring the frictional driven wheel 47 into engagement with the friction driving disk 90 at the axis of said disk the said disk will be stopped from rotating through the engagement of the right angled part 96 of the extension 95 of the arm 44 with the teeth 97 on the periphery of the friction driving disk 90. Thus, the spring motor 91 will not be in operation when the position of the frictional driven wheel 47 is such that it cannot be rotated by the friction driving disk 90 and the spring 107 will not be unwinding at a time when the means for rewinding it is not in operation.

The shaft 40 is given its upward or downward movement through the screw engagement of the threads thereon with the internal threads of the wide pinion 36. The shaft 40 is prevented from rotating by the arms 44 projecting from the collar 43 fixed upon the shaft 40 and through which arms 44 the shaft 45 passes. Therefore, when the pinion 36 is rotated in either direction, the shaft 40 is slid upwardly or downwardly according to the direction of rotation of the pinion 36, that pinion being prevented from travelling upon the shaft 40 by means of the bracket 39.

The pinion 36 is constantly engaged by the small pinion 37 and may be engaged by the segmental gear wheel 34. The segmental gear wheel 35 is also adapted to engage the small idler pinion 37 and to rotate the pinion 36 therethrough. The segmental gears 34 and 35 are arranged upon the shaft 22, to which they are fixedly secured, in such manner that the segmental gear wheel 34 cannot engage the pinion 36 while the segmental gear wheel 35 is in engagement with the idler pinion 37 and the segmental gear wheel 35 cannot engage the idler pinion 37 while the segmental gear wheel 34 is in engagement with the pinion 36. It will be evident that the pinion 36 will be rotated in an opposite direction when the segmental gear wheel 35 is in engagement with the idler pinion 37 and the shaft 22 is rotated than it will be when the segmental gear wheel 34 is in engagement with the pinion 36 and the shaft 22 is rotated in like direction. Of course, the degree of rotation communicated to the pinion 36 through the idler pinion 37 and the segmental gear wheel 35 with a given degree of rotation of the shaft 22 will be less than will be communicated to the pinion 36 through the direct engagement with it of the segmental gear wheel 34 with a like degree of rotation of the shaft 22.

The control lever 21 determines, through its position with respect to the graduations upon the scale plate 25, the speed and the direction of travel of the vehicle. When the pointer 24 indicates the point marked "S" upon the scale plate (see Figure 2), the elements of the mechanism are in such position that the throttle valve is fully closed and the spring motor 91 is not operating. Brakes are assumed to be set tight and the friction wheel 71 is, therefore, engaging the friction disk 67 at the axis of rotation of said disk in such manner that rotation of the disk 67 would not rotate the friction wheel 71.

When the lever 21 is moved to the right so that the indicator 24 points to "F" upon the scale plate 25, the shaft 22 is rotated to an extent corresponding to the degree of movement of the lever 21, which rotation of the shaft 22 first brings the segmental gear wheel 34 into engagement with the pinion 36 and then rotates that pinion through the said segmental gear wheel 34. This rotation of the pinion 36 causes the shaft 40 to be moved upwardly through the pinion 36 and the portion 96 of the arm 44 to be raised out of engagement with the teeth 97 on the periphery of the friction driving disk 90, releasing that disk and permitting the spring motor 91 to commence driving the disk 90 at a constant and determined speed. The same upward movement of the shaft 40 carries with it the frictional driven wheel 47 which is then driven by the friction driving disk 90 at a speed corresponding to the distance from the axis of the friction driving disk 90 of the engagement of the frictional driven wheel 47. Since the frictional driven wheel 47 is splined upon the shaft 45, that shaft will be rotated at like speed to the speed of the frictional driven wheel 47 and will spiral upwardly through the internally threaded bevel gear wheel 50, since that wheel will be stationary at that time.

The upward movement of the shaft 45 will continue until such time as the bevel gear wheel 50 attains a rotary speed in the same direction as the shaft 45 and at the same rate as the shaft 45 and this upward movement of the shaft 45 will open the throttle through the engagement of the circumferential rack teeth 53 with the pinion 54 on the valve stem 55. The opening of the throttle valve will feed fuel to the motor and place it in position to be started.

At this stage, the operator should bring into operation the self starting mechanism with which the vehicle is assumed to be equipped, so as to start the engine to operating, or the movement of the shaft 22 caused by the moving of the pointer 24 from the point "S" to the point "F" or the point "R" may be employed to bring into operation an automatically acting self starting mechanism, as described in my application for Letters Patent for starting mechanism for internal combustion engines, filed April 29th, 1921, Serial No. 465,569.

With the motor thus started into slow operation, the motor driven shaft 66 will be rotated, carrying with it the friction driving disk 67. As the pointer 24 is moved to the right from the point "F", the operator should throw off the brakes of the vehicle or this may be accomplished automatically at this point by the means described in my previous application for Letters Patent for machine control mechanism, filed March 21st, 1921, Serial No. 454,200.

As the brakes are loosened and the resistance offered to the rotation of the shaft 89 is reduced or removed the friction driven wheel 71 will move upwardly upon the shaft 72 and will drive the shaft 72 and, through the bevel gear wheels 87 and 88, the shaft 89. As heretofore explained, the rotation of the shaft 72 causes a proportional rotary speed to be developed in the bevel gear wheel 50 and when this speed of the bevel gear wheel 50 becomes equal to the speed in the same direction of the shaft 45 the said shaft 45 will remain stationary in respect to longitudinal movement. Should the motor develop speed beyond that required to drive the bevel gear wheel at like speed to the shaft 45 with the friction wheel 71 in given position with respect to the axis of its driving friction disk 67, this would cause the shaft 45 to spiral downwardly and to partially close the throttle valve, through the rack teeth 53, pinion 54 and valve stem 55, thus adjusting the engine speed.

The pointer 24 may be moved to the right to indicate any graduation, and the graduations upon the scale plate 25 may be, for instance, numerals showing miles per hour. When the pointer 24 is moved to indicate any numeral designating miles per hour, the vehicle is caused to travel at exactly that number of miles per hour, the said graduations being so spaced that the degree of rotation of the shaft 22 produced in moving the pointer 24 to the graduations is such as will cause the segmental gear wheel 34 to rotate the pinion 36 the amount necessary to raise the frictional driven wheel to a point relative to the axis of the friction driving disk 90 where such friction wheel will cause the shaft 45 to rotate at the same speed as the bevel gear wheel 50 does when the shaft 89 is rotating at a speed capable of causing the vehicle to move forwardly at the designated number of miles per hour. Any variations from this speed will be automatically corrected, as will be clear from the foregoing description.

When it is desired to have the vehicle travel backward, the pointer 24 is moved to the graduation left of "R" on the scale plate 25 that designates the rearward speed desired. As the shaft 22 is thus rotated, the segmental gear wheel 35 engages with the idler pinion 37 and thus rotates the pinion 36 in the same direction that rotation of the shaft 22 in the opposite direction rotates that pinion when there is engagement between that pinion 36 and the segmental gear wheel 34. Since a like degree of rotation of the shaft 22 will rotate the pinion 36 a lesser degree when such rotation is transmitted through the segmental gear wheel 35 and pinion 37 than when transmitted through the segmental gear wheel 34, the spaces between graduations are greater at the left of the point "R" on the scale plate 25 than to the right of that point. By having the vehicle equipped with ordinary reversing gears, rearward movement of the vehicle could be, of course, secured by merely operating such gears for reverse travel and then moving the pointer 24 as in forward travel.

It is desirable, however, to use this mechanism in conjunction with the reversing and braking mechanisms described in my application for Letters Patent for machine control mechanism heretofore referred to and with such reversing mechanism the reversal would be automatically performed while the pointer 24 was moving from the point "S" to the point "R" or vice-versa.

I claim:

1. In speed controlling mechanism, the combination of a motor driven shaft, a threaded member driven by said shaft, a member rotatable at constant speed, a threaded element driven by said member rotatable at constant speed and engaging with the said threaded member, a motive power supply governing member adapted to regulate the supply of fuel or power to the motor driving the said motor driven shaft, and means controlled by differences in the respective rotary speeds of the said threaded member and the said threaded element for automatically regulating the said motive power supply governing member to maintain the said motor driven shaft at a given ratio of speed to the speed of the said member rotatable at constant speed.

2. In speed controlling mechanism, the combination of a motor driven shaft, an internally threaded member driven by said motor driven shaft, a rotatable member driven at constant speed, a threaded shaft driven by said rotatable member and mounting the said internally threaded member thereon in screw engagement therewith, and means controlled by differences in the respective rotary speeds of the said threaded shaft and the said internally threaded member for so regulating the speed of the said motor driven shaft as to maintain the speed of said shaft at a given ratio to the constant rotary speed of the said rotatable member.

3. In speed controlling mechanism, the combination of a driving shaft, a rotatable member, means for driving the said rotatable member at constant speed, and automatically operating means for maintaining the rotary speed of the said driving shaft at a given ratio to the rotary speed of the said rotatable member.

4. In speed controlling mechanism, the combination of a driving shaft, a member driven by said driving shaft, a rotatable member driven at constant speed, an element driven by the said rotatable member, and automatically operating means controlled by variations in the speeds of the said member driven by said driving shaft and the said element with respect to each other for maintaining the rotary speed of the said driving shaft at a given ratio to the rotary speed of the said rotatable member.

5. In speed controlling mechanism, the combination of a driving shaft, a member driven by said driving shaft, a rotatable member driven at constant speed, an element driven by the said rotatable member, automatically operating means controlled by variations in the respective speeds of the said member driven by said driving shaft and the said element for maintaining the rotary speed of the said driving shaft at a given ratio to the rotary speed of the said rotatable member, and means under control of the operator for varying the ratio of the speed of the said driving shaft to the speed of the said rotatable member.

6. In speed controlling mechanism, the combination of a driving shaft, a member driven by said driving shaft, a rotatable member driven at constant speed, an element driven by the said rotatable member, means for regulating the rate of constant speed of the said rotatable member, and automatically operating means controlled by variations in the respective speeds of the said member driven by said driving shaft and the said element for maintaining the rotary speed of the said driving shaft at a given ratio to the rotary speed of the said rotatable member.

7. In speed controlling mechanism, the combination of a driving shaft, an internally threaded member driven by said driving shaft, a rotatable member, means adapted to drive the said rotatable member at constant speed, a threaded shaft rotatable by the said rotatable member and having the said internally threaded member mounted thereon in screw engagement therewith, automatically operating means controlled by variations in the respective rotary speeds of the said threaded shaft and the said internally threaded member for maintaining the speed of the said driving shaft at a given ratio to the constant speed of the said rotatable member, and means under the control of the operator for varying the said fixed ratio at will.

8. In speed controlling mechanism, the combination of a driving shaft, an internally threaded member driven by said driving shaft, a rotatable member, means adapted to drive the said rotatable member at constant speed, means for regulating the rate of the constant speed of the said rotatable member at will, a rotatable threaded shaft driven by said rotatable member with the said internally threaded member mounted thereon in screw engagement therewith, and automatically operating means controlled by variations in the respective rotary speeds of the said threaded shaft and the said internally threaded member for maintaining the speed of the said driving shaft at a given ratio to the constant speed of the said rotatable member.

9. In speed controlling mechanism, the combination of a driving shaft, an internally threaded member driven by said driving shaft, a rotatable member, means adapted to drive the said rotatable member at constant speed, means for regulating the rate of the constant speed of the said rotatable member at will, a rotatable threaded shaft driven by said rotatable member and mounting the said internally threaded member thereon in screw engagement therewith, automatically operating means controlled by variations in the respective rotary speeds of the said threaded shaft and the said internally threaded member for maintaining the speed of the said driving shaft at a given ratio to the constant speed of the said rotatable member, and means under the control of the operator for varying the said fixed ratio at will.

10. In speed controlling mechanism, the combination of a driving shaft, an internally threaded member driven by said driving shaft, a friction disk, means for independently driving said friction disk at constant speed, means for regulating the rate of the constant speed of the said friction disk, a rotatable threaded shaft mounting the said internally threaded member thereon and in screw engagement therewith, a friction wheel splined upon the said threaded shaft and movable longitudinally thereof and thereon and radially of the said friction disk in frictional engagement with said disk, means for moving said friction wheel radially of said friction disk at the will of the operator, a rack carried by the said threaded shaft, a motor regulating member, and a pinion carried by said motor regulating member and engaging with the said rack.

11. In speed controlling mechanism, the combination of a motor driven shaft, a member driven at constant speed, cooperating elements driven respectively by the said shaft and the said member, and automatically operating means controlled by the said cooperating elements and adapted to maintain the said motor driven shaft at a given ratio of speed to the speed of the said member driven at constant speed.

12. In speed controlling mechanism, the combination of a driving shaft, an internally threaded member driven by said driving shaft, a rotatable member, means adapted to drive the said rotatable member at constant speed, a threaded shaft rotatable by the said rotatable member and having the said internally threaded member mounted thereon in screw engagement therewith, automatically operating means controlled by variations in the respective rotary speeds of the said threaded shaft and the said internally threaded member for maintaining the speed of the said driving shaft at a given ratio to the constant speed of the said rotatable member, a graduated scale, a control lever, an indicator carried by said control lever and adapted to indicate graduations upon the said graduated scale, and means controlled by the said control lever for varying the said given ratio of the speed of the said driving shaft to the speed of the said rotatable member.

13. In speed controlling mechanism, the combination of a driving shaft, a driven shaft, automatically operating speed changing mechanism adapted to transmit rotary motion from the said driving shaft to the said driven shaft at speed ratios therebetween controlled by the degrees of resistance offered to the rotation of the said driven shaft, a rotatable member, means for driving the said rotatable member at constant speed, and automatically operating means for maintaining the rotary speed of the said driven shaft at a given ratio to the rotary speed of the said rotatable member.

14. In speed controlling mechanism, the combination of a driving shaft, a driven shaft, speed changing mechanism adapted to transmit the rotary motion of the said driving shaft to the said driven shaft at varying ratios therebetween, an internally threaded member driven by the said driven shaft, a rotatable member, means adapted to drive the said rotatable member at constant speed, a threaded shaft rotatable by the said rotatable member and mounting the said internally threaded member thereon in screw engagement therewith, and automatically operating means controlled by variations in the respective rotary speeds of the said threaded shaft and the said internally threaded member for so varying the rotary speed of the said driving shaft as to maintain the said driven shaft at a given ratio of speed to the speed of the said rotatable member throughout all changes in the ratio of the rotary speed of the said driven shaft to the rotary speed of the said driving shaft.

15. In speed controlling mechanism, the combination of a driving shaft, a driven shaft, automatically operating speed changing mechanism adapted to transmit rotary motion from the said driving shaft to the said driven shaft at speed ratios therebetween controlled by the degree of resistance offered to the rotation of the said driven shaft, a rotatable member, means adapted to rotate the said rotatable member at constant speed, a rotatable threaded shaft driven by the said rotatable member and mounting thereon in screw engagement therewith an internally threaded member driven by the said driven shaft, and automatically operating means controlled by variations in the respective rotary speeds of the said threaded shaft and the said internally threaded member for so varying the rotary speed of the said driving shaft at each variation of the ratio of the rotary speed of the said driven shaft to the rotary speed of the said driving shaft as to maintain the said driven shaft at a given ratio of speed to the speed of the said rotatable member.

16. In speed controlling mechanism, the combination of a rotatable friction disk, means for rotating the said friction disk at constant speed, a friction wheel adapted to engage the said friction disk at varying distances from the axis of said friction disk and to be rotated by said friction disk at correspondingly varying speeds, a threaded member rotatable with the said friction wheel, a second threaded member in screw engagement with the first mentioned threaded member and rotatable in like direction to the said first mentioned threaded member, an independently driven shaft adapted to so rotate the said second threaded member, and automatic means for regulating the speed of the said driven shaft in such manner as to cause said shaft to rotate the said second threaded member at like speed to the speed of the said first mentioned threaded member.

17. In speed controlling mechanism, the combination of a driving shaft, a driven shaft, automatically operating speed changing mechanism adapted to transmit rotary motion from the said driving shaft to the said driven shaft at speed ratios therebetween controlled by the degree of resistance offered to the rotation of the said driven shaft, a rotatable member, means adapted to rotate the said rotatable member at constant speed, automatically operating means for maintaining the rotary speed of the said driven shaft at a given ratio to the constant rotary speed of the said rotatable member, and means under the control of the operator for varying the said fixed ratio at will.

18. In speed controlling mechanism, the combination of a rotatable friction disk, means for rotating the said friction disk at constant speed, a friction wheel adapted to engage the said friction disk at varying distances from the axis of said friction disk and to be rotated by the said friction disk at correspondingly varying speeds, means under the control of the operator for changing the position of the said friction wheel in its engagement with the said friction disk and with respect to the axis of said friction disk in such manner as to regulate the speed of the said friction wheel to any rate desired by the operator, a shaft rotatably and slidably mounted and adapted to be rotated with the said friction wheel but movable longitudinally independently of said friction wheel, threads upon a portion of said shaft, an internally threaded rotatable member adapted to be rotated in like direction to the direction of the said shaft and mounted in screw engagement upon said shaft, an independently driven shaft adapted to rotate the said internally threaded rotatable member, and means controlled by the longitudinal movements of the said first named shaft for governing the speed of the aforesaid independently driven shaft.

19. In speed controlling mechanism, the combination of a rotatable friction disk, means for driving said friction disk at constant rotary speed, a friction wheel engaging frictionally with said friction disk and rotatable thereby, means for moving the said friction wheel radially of the said friction disk while maintaining engagement therewith, and automatically operating means for locking the said friction disk against rotation whenever the said friction wheel engages the said friction disk at or near the axis of rotation of the said friction disk and for unlocking the said friction disk whenever the said friction wheel is moved radially of the said friction disk and away from the axis thereof.

20. In speed controlling mechanism, the combination of a driving shaft, a driven shaft, automatically operating speed changing mechanism adapted to transmit rotary motion from said driving shaft to said driven shaft at speed ratios therebetween controlled by the degree of resistance offered to the rotation of the said driven shaft, a rotatable member, means adapted to rotate the said rotatable member at constant speed, automatically operating means for maintaining the rotary speed of the said driven shaft at a given ratio to the constant rotary speed of the said rotatable member throughout all variations in the ratios of the speed of the said driven shaft to the speed of the said driving shaft under varying degrees of resistance offered to the rotation of the said driven shaft, a control lever, a graduated scale carrying numerals or other characters designating speed of operation, an indicator carried by said control lever and adapted to indicate graduations upon the said graduated scale, and means controlled by movements of the said control lever at the will of the operator for varying the said given ratio between the speeds of the said driven shaft and the said rotatable member in such manner that the rotary speed of the said driven shaft is always at the rate indicated by the graduation upon the said graduated scale by the said indicator carrier by the said control lever.

21. In speed controlling mechanism, the combination of a driving shaft, a driven shaft, speed changing mechanism, a member rotatable at constant speed, and automatically operating means for maintaining the said driven shaft at a given ratio of speed to the speed of the said rotatable member, regardless of changes in the ratios of the speed of the said driven shaft to the speed of the said driving shaft.

22. In speed controlling mechanism, the combination of a driving shaft, a driven shaft, speed changing mechanism adapted to transmit rotary motion from the said driving shaft to the said driven shaft at varying speed ratios therebetween, a member rotatable at constant speed, and automatically operating means for so changing the speed of the said driving shaft at each readjustment of the said speed changing mechanism as to maintain the said driven shaft at a given ratio of speed to the speed of the said rotatable member.

23. In speed controlling mechanism, the combination of a driving shaft, a driven shaft, speed changing mechanism adapted to transmit rotary motion from the said driving shaft to the said driven shaft at varying ratios of speed therebetween, a rotatable member, driving means adapted to rotate the said rotatable member at constant speed, means adapting the said driving means to absorb and store motive power for the independent operation of said driving means from the said driving shaft, and automatically operating means adapted to maintain the said driven shaft at a given ratio of speed to the speed of the said rotatable member.

24. In speed controlling mechanism, the combination of a driving shaft, a driven shaft, speed changing mechanism adapted to transmit rotary motion from the said driving shaft to the said driven shaft at varying ratios of speed therebetween, a rotatable member, resilient driving means for said rotatable member, governing means adapting the said rotatable member to be driven at constant speed, means adapting the said driving shaft to wind the said resilient means, means for rendering the said last named means inoperative whenever the said resilient means is fully tensioned, and automatically operating means adapted to maintain the said driven shaft at a given ratio of speed to the speed of the said rotatable member.

25. In speed controlling mechanism, the combination of a driving shaft, a rotatable member, means for driving the said rotatable member at constant speed, a member movable radially of and driven by the said rotatable member, and automatically operating means for maintaining the speed of the said driving shaft at a fixed ratio to the speed of the said radially movable member.

26. In speed controlling mechanism, the combination of a driving shaft, an independently driven rotatable member, means controllable by the operator for regulating the speed of the said rotatable member, and automatically operating means for maintaining the speed of the said driving shaft at a fixed ratio to the speed of the said rotatable member.

27. In speed controlling mechanism, the combination of a driving shaft, a driven shaft, automatically operating speed ratio changing mechanism interposed between the said shafts and adapted to vary the ratio of the rotary speed of the said driven shaft to the rotary speed of the said driving shaft inversely to variations in the degree of resistance offered to the rotation of the said driven shaft, a rotatable member, means for driving said rotatable member at constant speed, two threaded members in screw engagement and driven respectively by the said rotatable member and by gearing operating at a fixed ratio of speed to the speed of the said driven shaft, and means controlled by the said two threaded members for so varying the speed of the said driving shaft at each variation in the ratio of the speed of the said driven shaft to the speed of the said driving shaft as to maintain the speed of the said driven shaft substantially constant.

28. In speed controlling mechanism, the combination of a driving shaft, a driven shaft, automatically operating speed changing mechanism interposed between the said shafts and adapted to transmit rotary motion from the said driving shaft to the said driven shaft at ratios therebetween varying with the resistance offered to the rotation of the said driven shaft, a rotatable member, means for driving said rotatable member at constant speed, a rotatable element adapted to be driven at varying speed ratios to the said rotatable member and to be driven thereby, a second rotatable element in engagement with the first named rotatable element and driven at a fixed ratio of speed to the speed of the said driven shaft, and automatic means controlled by the movements of one of the said rotatable elements relative to the other of the said rotatable elements for so varying the speed of the said driving shaft at each change in the speed ratio between the said driving shaft and the said driven shaft as to maintain the speed of the said driven shaft substantially constant.

29. In speed controlling mechanism, the combination of a driving shaft, a driven shaft, a rotatable member, means for driving the said rotatable member at constant speed, speed ratio changing mechanism interposed between the said driving shaft and the said driven shaft, an element movable radially of and driven by the said rotatable member, and automatically operating means for maintaining the speed of the said driven shaft at a fixed ratio to the speed of the said element throughout variations in the speed ratio between the said driving and driven shafts.

CHARLES H. GILL.